May 27, 1958

A. SPIELBERG 2,836,715

SIGNAL SHAPING CIRCUIT

Filed April 8, 1953

INVENTOR.
Arnold Spielberg
BY Morris A. Rabkin
ATTORNEY 2,836,715

SIGNAL SHAPING CIRCUIT

Arnold Spielberg, Haddonfield, N. J., assignor to Radio Corporation of America, a corporation of Delaware Application April 8, 1953, Serial No. 347,496

6 Claims. (Cl. 250—27)

This invention relates to a signal shaping circuit, and more particularly, to a circuit for reducing the duration of a signal impulse of predetermined duration.

In pulse circuits which depend for operation upon the coincidence of a plurality of voltage impulses the problem of eliminating spurious output signals frequently arises. The spurious output signals are caused by the pulses not starting or ending together or not having identical durations. This may be due to inherent transient effects in the circuits which produce differences in rise or fall times of the pulses or cause delays in transmission of the pulses. One method of eliminating the spurious output signals is to gate the circuit with a clock or timing pulse which starts after the other pulses have started and is of shorter duration than the other pulses.

Accordingly, it is an object of this invention to provide a new and improved pulse-forming circuit.

Another object of this invention is to provide a simple pulse-forming circuit that reduces the duration of a pulse without attenuation.

Still another object of this invention is to provide an inexpensive pulse-forming circuit that delays the start and reduces the duration of a pulse.

Yet another object of this invention is to provide a system for eliminating spurious signals from a pulse-responsive circuit.

These and other objects of this invention are achieved by means of an electrical delay line formed of lumped capacitances and inductances. Positive pulses are applied to the input terminal of the delay line by a driver circuit including a pulse transformer. Shunted across the delay line is a diode with its cathode and anode respectively connected to the input and output terminals of the delay line. The delay characteristic of the delay line is less than the period of duration of the pulses applied to it. The input pulse appears after the delay at the output terminal. Upon termination of the input pulse, the input terminal is at a lower potential than the output terminal causing the diode to conduct and clamp the output terminal to the potential at the input terminal. Thus, the duration of the pulse is reduced by the amount of the delay period.

The novel features of this invention, both as to its organization and mode of operation, may be better understood from consideration of the following description when read together with the accompanying drawings in which.

Figure 1:
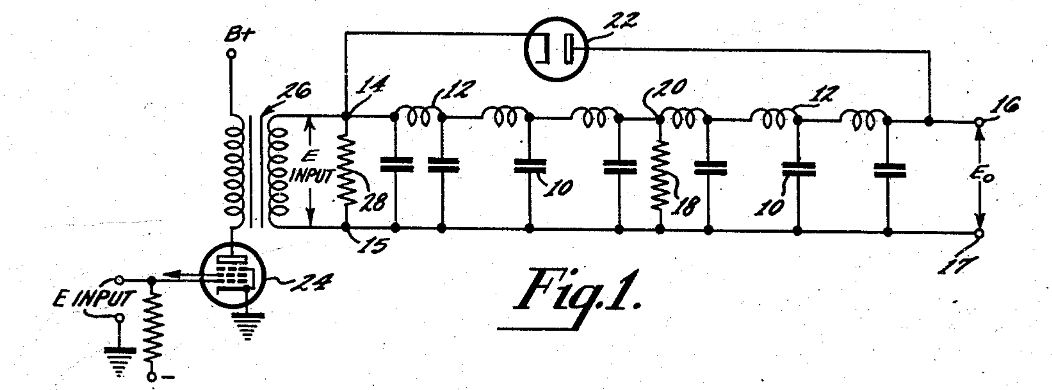
Figure 1 is a schematic circuit diagram of a pulse-forming circuit embodying this invention.

Referring now to Figure 1, a pulse-forming circuit embodying this invention is shown. The circuit includes an electrical delay line formed of lumped capacitances 10 and inductances 12 and having a delay characteristic D. Signals to be delayed are applied to the input terminals 14, 15 of the delay line, and they are propagated to the output terminals 16, 17. The delay line is unterminated at its output terminals 16, 17, that is to say, terminated by an impedance which is relatively infinite. A resistor 18 terminates the delay line at its electrical center 20 or point of half delay. The magnitude of this resistance 18 is twice the characteristic impedance of the delay line. A diode 22 is connected across the delay line with the cathode of the diode 22 connected to an input terminal 14 and the anode connected to an output terminal 16. Positive input pulses are applied to the delay line through an amplifier circuit made up of an amplifier tube 24 and a pulse transformer 26. The primary of the transformer 26 is connected in the anode circuit of the amplifier 24, and the secondary is connected to the input terminals 14, 15 of the delay line. The input terminals 14, 15 of the delay line are terminated by a resistance 28 whose magnitude is chosen so that the combination of the characteristic impedance of the delay line and of this resistance gives the required load on the pulse transformer 26.

Figure 2:
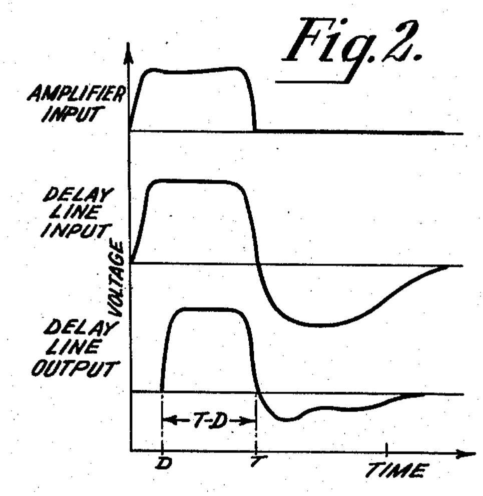
Figure 2 is a graphical diagram of waveforms occurring at various portions of the pulse-forming circuit.

The amplifier 24 is driven by a positive input pulse of duration T greater than the delay characteristic D. Conduction in the amplifier 24 energizes the primary of the transformer 26 and a positive pulse is applied to the input 14 of the delay line. This pulse has a low source impedance and also a negative overshoot due to the energy stored in the fields of the transformer windings after the termination of the input pulses (Figure 2). The delay line propagates the applied pulse to the output terminal 16 with a delay D, so that, at time D, the leading edge of the pulse arrives at the output terminal 16. Prior to time D, the output terminal 16 is at a lower voltage than the input terminal 14. Thus, there is a positive bias on the cathode of the diode 22 so that it is cut off. At time D, the anode of the diode 22 rises to the amplitude of the pulse. This condition continues until time T when the pulse terminates, falling to zero, and the overshoot produces a negative voltage at the cathode of the diode 22. Consequently, the diode conducts after termination of the pulse. As the pulse energy stored in the delay line at time T continues to propagate to the output terminal 16, it is added by superposition to the negative overshoot at the input 14. Thus, the diode causes the output terminal 16 to follow the potential at the input terminal 14. The composite waveform at the output terminal, after time T, appears as a negative trailing overshoot.

During the time period from D to T, the voltage at the output terminal tends to be greater than the amplitude of the input pulse due to a series resonance effect caused by the delay line being left unterminated. Therefore, during the plateau of the output pulse, the output voltage is not less than the input. Any rise in output voltage above the input voltage is cancelled by conduction through the diode. Thus, during the plateau of the pulse, the output voltage is also not greater than the input. As a result, there is no attenuation of the pulse by the delay line, so that delay-line insertion losses are nullified, and the amplitude of the output pulse is substantially equal to that of the input pulse.

The terminating resistor 18 at the electrical center of the delay line serves to eliminate oscillations due to reflections, which would otherwise produce alternate positive and negative exponential decaying pulses at the output. It is preferred that termination be at the electrical center 22 of the delay line where the magnitude of the oscillations is greatest due to the phases combining additively.

When the period of the input pulse T is less than or equal to the delay characteristic D of the delay line, complete pulse cancellation takes place with the diode shorting out the output. The circuit, therefore, can be used as a means for making comparisons of pulse widths to the extent that they are greater than the delay characteristic or not. An output pulse is produced only if the pulse under test is greater than the delay.

If the negative overshoot is not desired, a diode (not shown) may be connected across the secondary of the pulse transformer 26 with the cathode at the upper terminal 14 and the anode at the lower terminal 15. Such a diode limits the pulses at the input terminal to those of positive polarity. The circuit of this invention is not restricted in its application to a pulse-transformer input. Other low impedance sources such as cathode follower may be used.

Thus, it may be seen that with the circuit of this invention the duration of a pulse may be reduced or narrowed using few elements and without the attendant insertion loss of a delay line. The circuit may also be used to narrow negative pulses. This may be done merely by reversing the polarity of the diode across the delay line and by reversing the polarity of the transformer primary connections to provide an input pulse of opposite polarity.

This invention is not limited to the particular form of delay line having lumped constants that is described above. Although this form is preferred, the invention may also be used with a delay line having distributed constants. Likewise, a delay-line of the resistance-capacitance type may be used. Also applicable, and adaptable for use in this invention are delay lines of the sonic and magnetostrictive types.

Figure 3:
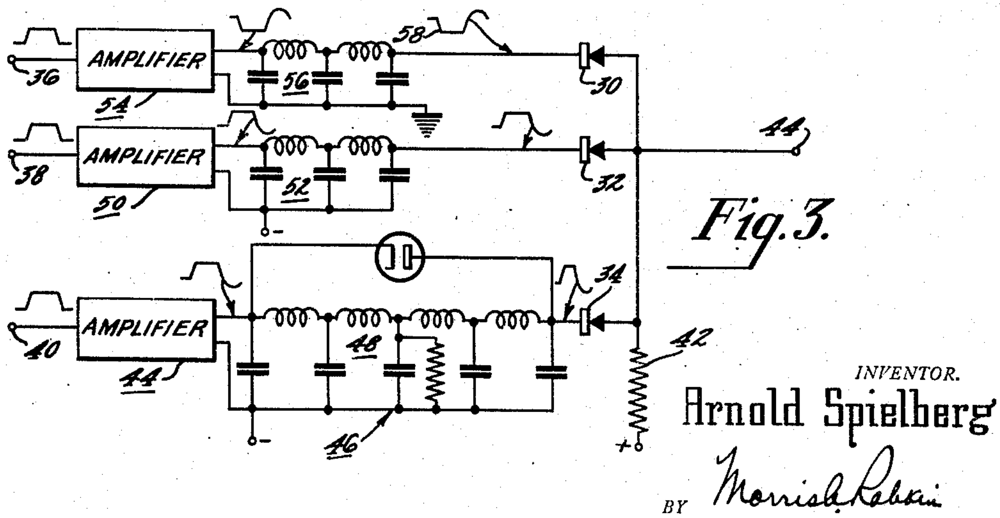
Figure 3 is a schematic circuit diagram of a system for eliminating spurious signals embodying this invention.

A circuit embodying this invention may be used to eliminate the spurious signals in the output of a pulse-responsive circuit which may occur when the input pulses do not have the same starting and ending times or duration. The circuit in Figure 3 includes a diode coincidence circuit of the type described by J. H. Felker in "Transistor Digital Computer," Electrical Engineering, December 1952, pages 1103–1108. The circuit includes first, second and third crystal diodes 30, 32, 34 which have their cathodes coupled to different input terminals 36, 38, 40, and their anodes connected to a positive source of potential (not shown) through a load resistor 42. An output terminal 44 is connected to the anodes. One of the pulses applied to the circuit may be a positive gating pulse. The gating pulse is delayed and narrowed through an amplifier circuit 44 and a pulse-narrowing circuit 46, of the type described above, and applied as a positive pulse to the cathode of the third diode. The delay characteristic of the delay line 48 in the pulse-narrowing circuit 46 is of duration D which is about half of the duration T of the gating pulse. A positive input pulse is applied to the second diode 32 through an amplifier circuit 50, of the type described above, and delayed through an electrical delay line 52 having a delay period $$\frac{D}{2}$$

half of the delay of the narrowing circuit 46. A positive pulse applied to the first input terminal 36 is inverted by an amplifier circuit 54, of the type described above with the transformer primary connections reversed, and applied as a negative inhibiting pulse 58 to the first diode 30, through a delay line 56 of delay $$\frac{D}{2}$$

In practice, the duration periods for the different channels may vary in length, in which case, the delay periods of the first and second delay lines 52, 56 are preferably chosen to be such as to provide a total delay period of $$\frac{D}{2}$$

for the pulses applied to the diodes. The cathodes of the second and third diodes 32, 34 are negatively biased, and the cathode of the first diode 30 is normally at ground.

Figure 4:
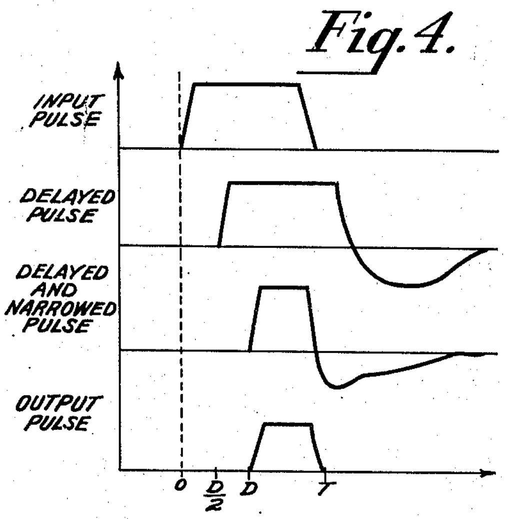
Figure 4 is a graphical diagram of waveforms occurring at portions of the circuit of Figure 3.

The second and third diodes 32, 34 are normally conducting with their anodes at the negative bias potential, and the first diode 30 is cut off with its anode negative and cathode at ground. With the application of positive pulses, of duration T, to the second and third input terminals 38, 40 only, a positive pulse of duration T appears at the cathode of the second diode 32 after a delay $$\frac{D}{2}$$

to block that diode, and a positive pulse of duration T—D appears at the cathode of the third diode 34 after a delay D to block that diode. As can be seen from the waveforms of Figure 4, the gating pulse is centered with respect to the other pulse. At time $$\frac{D}{2}$$

the third diode still conducts holding the output terminal 44 at the negative bias potential. However, at time D, the anodes of both of these diodes rise to ground potential, to which they are clamped by the first diode 30, and a positive output pulse is produced that starts at time D and lasts until time T. If in addition, the first input terminal 36 is pulsed, a negative inhibiting pulse 58 is applied after a delay $$\frac{D}{2}$$

to the first diode causing it to conduct at time $$\frac{D}{2}$$

thereby holding the output terminal at a negative potential for the duration T of the pulse. Thus, when the gating pulse arrives at time D to block the third diode, the output is already inhibited, and there is no spurious output signal. Likewise, a spurious signal is prevented at the trailing edges of the pulses, due to the inhibiting pulse terminating after the gating pulse. Without a substantial narrowing of the gating pulse, this pulse may start before or end after the inhibiting, which would cause the coincidence circuit to operate and produce a spurious output. This system for eliminating spurious signals is not restricted in its application to the particular coincidence circuit shown.

Thus, it may be seen from the above description of this invention that a pulse-narrowing circuit is provided which is reliable and is economical in the components required. This circuit is useful in a system for eliminating spurious output signals from pulse-responsive circuits.

What is claimed is:

1. In a circuit arrangement wherein a plurality of voltage impulses are applied to at least two input terminals of a circuit which is responsive to said impulses for producing an output signal, and wherein one of said impulses is of predetermined duration and is applied to one of said input terminals; a system for eliminating spurious output signals comprising means for reducing the duration of said one impulse including an electrical delay line having an input and output terminal, a common circuit path, and a delay characteristic less than the duration of said one impulse, and a unilateral impedance element coupled between said delay-line terminals for passing signals from said output to said input delay-line terminals of the same polarity as the impulse applied to said delay-line input terminal; means for delaying the voltage impulse applied to the other input terminal of the impulse responsive circuit for a period less than the delay characteristic of said electrical delay line; and means for applying the impulse of reduced duration and the delayed impulse to said input terminals of said impulse-responsive circuit.

2. In a system wherein impulses of certain polarities are applied to at least two input terminals of a circuit which is responsive to said impulses for producing output signals; the combination of two electrical channels having different delay characteristics, one of said electrical channels including a delay line having an input and an output, and a unilateral impedance element coupled between said delay line input and output in a direction tending to provide a shunt to said delay line during a final portion of the impulse applied thereto, the other of said electrical channels including means for delaying impulses for a period less than the delay characteristic of said one channel and separate means for respectively coupling said electrical channels to said two input terminals.

3. A signal forming circuit as recited in claim 2 wherein said delay line is an electrical delay line formed of capacitances and inductances.

4. A signal forming circuit as recited in claim 3 wherein said electrical delay line is terminated at the electrical center thereof by a resistance element equal to twice the characteristic impedance of said delay line.

5. A circuit for reducing the duration of a signal impulse of predetermined duration and polarity comprising an electrical delay line having an input and an output terminal and a common connection and having a delay characteristic less than the predetermined duration of said signal impulse, means for applying said signal impulse between said input terminal and said common connection, a unilateral impedance element, and means coupling said unilateral impedance element between said terminals for passing signals of said predetermined polarity from said output terminal to said input terminal to produce an output impulse at said output terminal in response to said input signal impulse after said time corresponding to said delay characteristic and of a duration reduced by an amount corresponding to said delay characteristic, said delay line being formed of capacitances and inductances connected in networks between said terminals and said common connection, and said delay line being terminated by a resistance element connected between said common connection and a point intermediate said input and output terminal.

6. A circuit for reducing the duration of a signal impulse of predetermined duration and polarity comprising an electrical delay line having an input and an output terminal and a common connection and having a delay characteristic less than the predetermined duration of said signal impulse, a pulse transformer for applying said signal impulse between said input terminal and said common connection, a unilateral impedance element, and means coupling said unilateral impedance element between said terminals for passing signals of said predetermined polarity from said output terminal to said input terminal to produce an output impulse at said output terminal in response to said input signal impulse after said timel corresponding to said delay characteristic and of a duration reduced by an amount corresponding to said delay characteristic, said delay line being formed of capacitances and inductances connected in networks between said terminals and said common connection, and said delay line being terminated by a resistance element substantially equal to twice the characteristic impedance of said delay line and connected between said common connection and a point intermediate said input and output terminal.

References Cited in the file of this patent

UNITED STATES PATENTS

| | | |
|---|---|---|
| 2,227,906 | Kellogg | Jan. 7, 1941 |
| 2,303,968 | White | Dec. 1, 1942 |
| 2,443,790 | Forbes | June 22, 1948 |
| 2,579,071 | Hansell | Dec. 18, 1951 |